United States Patent [19]
Simioni et al.

[11] Patent Number: 5,748,281
[45] Date of Patent: May 5, 1998

[54] CONNECTING DEVICE PARTICULARY FOR EYEGLASSES

[75] Inventors: Luciano Simioni; Sergio Menegon, both of Montebelluna, Italy

[73] Assignee: Killer Loop S.p.A., Pederobba, Italy

[21] Appl. No.: 659,848

[22] Filed: Jun. 7, 1996

[30] Foreign Application Priority Data

Jun. 14, 1995 [IT] Italy .................. TV95A0071

[51] Int. Cl.⁶ .................................................. G02C 5/14
[52] U.S. Cl. ................................................ 351/121; 351/119
[58] Field of Search ................................ 351/111, 116, 351/119, 121

[56] References Cited

U.S. PATENT DOCUMENTS 5,042,934  8/1991  Nakanishi ..................... 351/124
5,080,476  1/1992  Monin ........................... 351/121

FOREIGN PATENT DOCUMENTS 0450225  10/1991  European Pat. Off. .
0496292   7/1992  European Pat. Off. .
0656557   6/1995  European Pat. Off. .
0667552   8/1995  European Pat. Off. .
0690331   1/1996  European Pat. Off. .
4118018   5/1992  Germany .

Primary Examiner—Huy Mai
Attorney, Agent, or Firm—Guido Modiano; Albert Josif

[57]  ABSTRACT

A connecting device, particularly usable for eyeglasses, having two elements that are rotatably associable to each other and can be detachably connected to two separate components of the eyeglasses, at least one of the components being made of a material that cannot be welded to the device, such as aluminum. It is thus possible to produce aluminum or carbon fiber eyeglasses without welds.

23 Claims, 6 Drawing Sheets

CONNECTING DEVICE PARTICULARY FOR EYEGLASSES

BACKGROUND OF THE INVENTION

The present invention relates to a connecting device particularly usable for eyeglasses.

Conventional eyeglasses can currently be made of plastics or metal: in the first case, it is known to use, for example, a front that is connected to temples by using appropriate hinges, which are respectively embedded in, or associated with, the front and the temple at their ends.

In the specific case of metal eyeglasses, the connection between the elements constituting the hinge, the front and the temple, occurs by welding or by using adapted screws that pass at complementarily threaded holes formed on the components.

In the specific case in which the eyeglasses must be made of metal, particularly aluminum, considerable problems arise in welding the metal parts; at the same time, oxides form which make the eyeglasses unpleasant from the ornamental point of view.

SUMMARY OF THE INVENTION

A principal aim of the present invention is to solve the technical problems, eliminating the drawbacks of the cited prior art, therefore providing a device that allows to detachably connect, very quickly and easily and with low manufacturing costs, two components of eyeglasses, such as for example a front and a temple, at least one whereof is made of aluminum or fiberglass.

Within the scope of this aim, an important object is to provide a device that allows quick and easy disconnection of the two components of the eyeglasses for possible replacement or maintenance of said components.

Another important object is to provide a connecting device that is not subject to oxidations that can alter the aesthetics of the eyeglasses.

Another object is to provide a connecting device that can be produced with conventional machines and equipment and is reliable and safe in use.

This aim, these objects, and others which will become apparent hereinafter are achieved by a connecting device, particularly for eyeglasses, characterized in that it is constituted by a first and a second elements that are rotatably associable to each other and can be detachably connected to two separate components of said eyeglasses, at least one whereof is made of a material that cannot be welded thereto, such as aluminum or carbon fibers.

BRIEF DESCRIPTION OF THE DRAWINGS

Further characteristics and advantages of the invention will become apparent from the following detailed description of a particular but not exclusive embodiment thereof, illustrated only by way of non-limitative example in the accompanying drawings, wherein.

DESCRIPTION OF THE PREFERRED EMBODIMENTS

Figure 1:
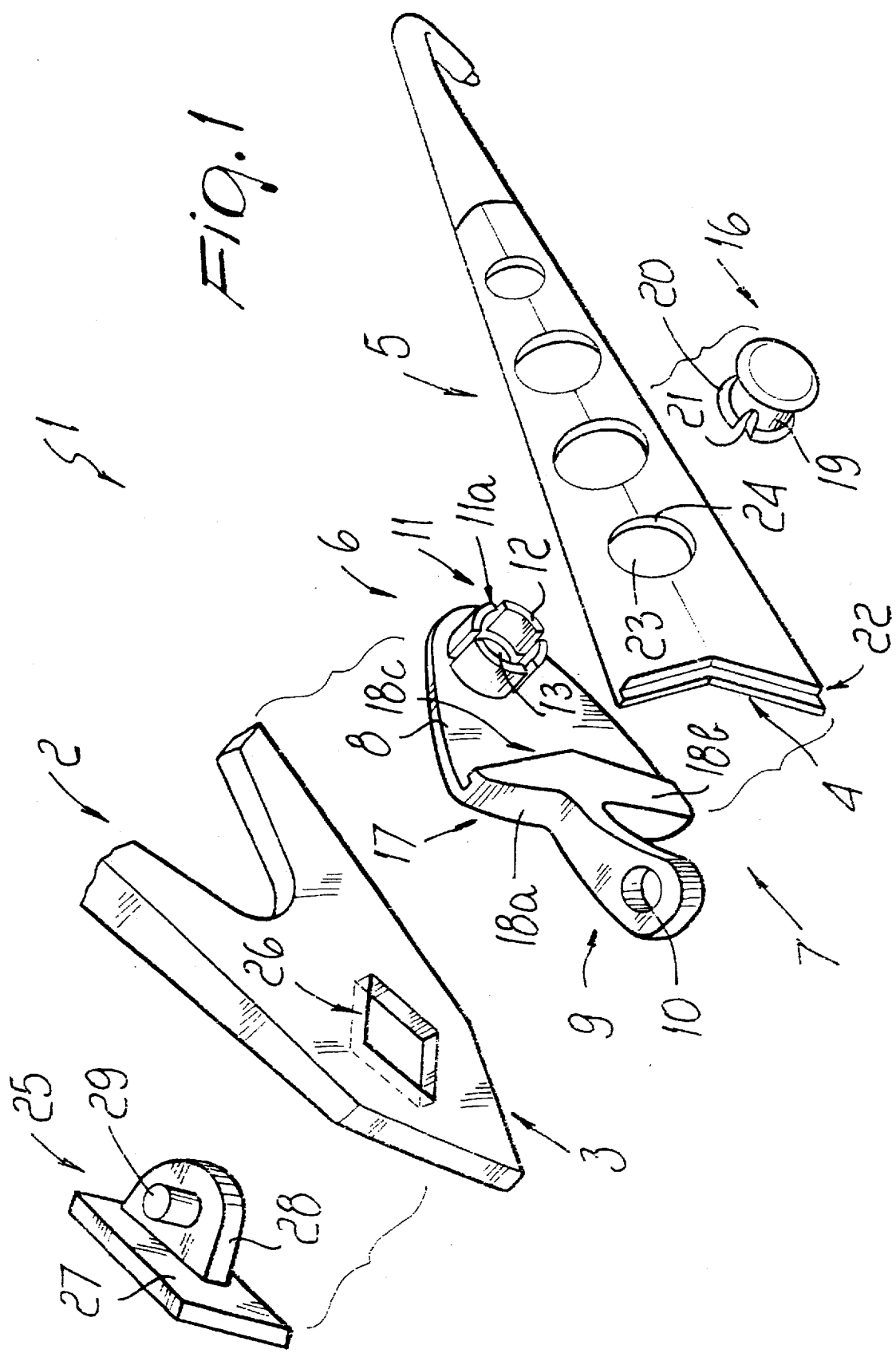
FIG. 1 is an exploded view of eyeglasses in which the front is shown partially.
Figure 2:
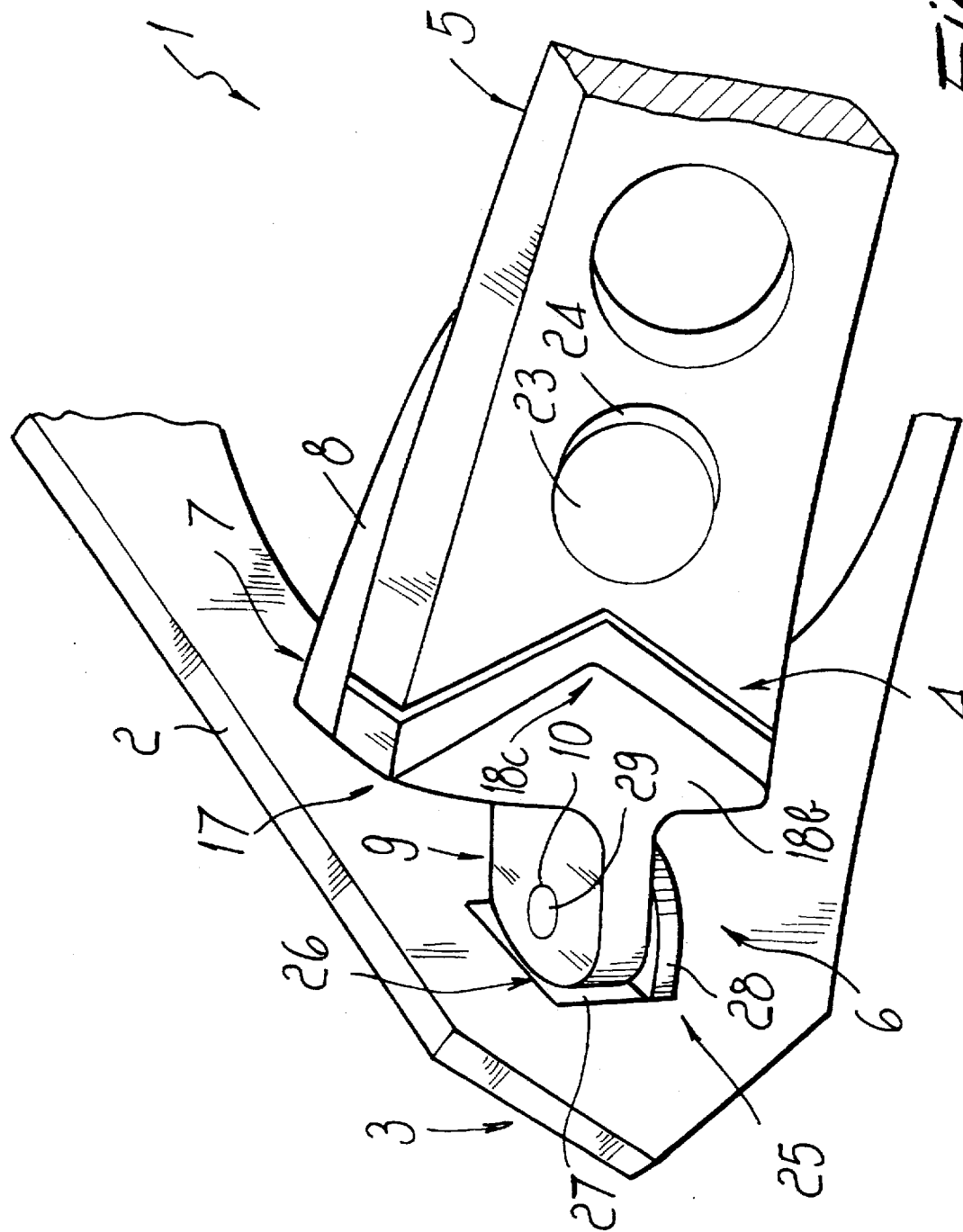
FIG. 2 is a perspective view of FIG. 1, with the components shown assembled and with the insert omitted.
Figure 3:
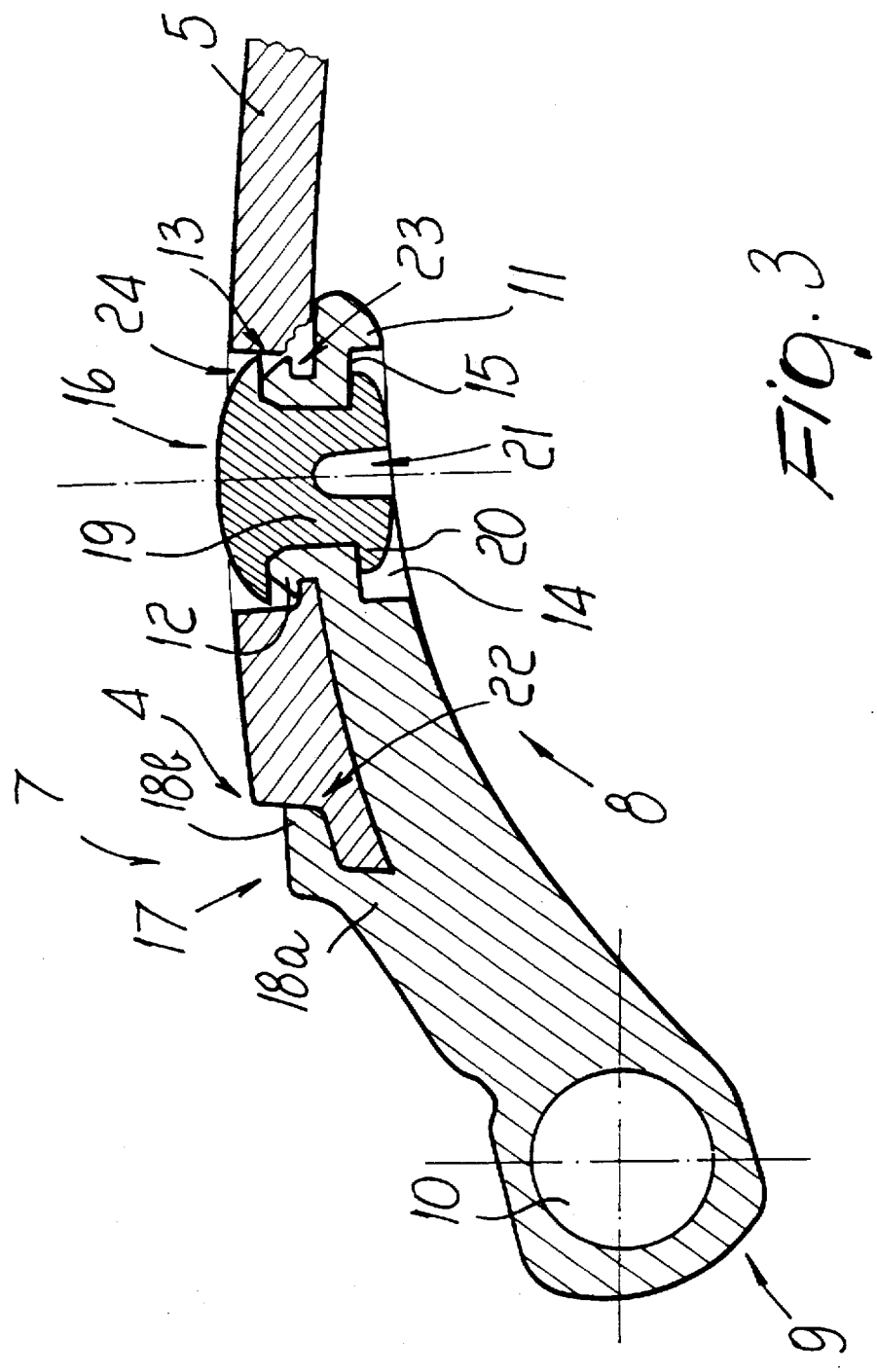
FIG. 3 is a sectional view, taken along a median plane lying longitudinally to the temple.

With reference to the above figures, the reference numeral 1 designates eyeglasses constituted by a front 2, with the lateral ends whereof the ends 4 of two temples 5 are associable by interposing a connecting device 6 made of plastics; one of said lateral ends is designated by the reference numeral 3 in the drawing, and said temples are made of aluminum or carbon fiber.

The connecting device 6 is constituted by a first element, designated by the reference numeral 7, constituted by a flat base 8 that can be arranged adjacent to the temple 5 at the internal surface of the end 4 that is directed towards the user's temple.

A curved tab 9 protrudes approximately axially from the flat base 8 and has a first hole 10 formed along an axis that lies on a plane approximately parallel to the plane containing said flat base 8.

A raised portion 11 in the form of a male part for temporary coupling to the temple 5 protrudes at right angles from the flat base 8 at the opposite end with respect to the tab 9.

Said raised portion 11 is cylindrical and has notches, along some of its generatrices, that allow it to deform elastically; at the upper perimetric edge 11a, said raised portion 11 furthermore has a first annular flap 12 that protrudes outside it.

A second hole 13 is formed axially with respect to the raised portion 11, on the flat base 8, and a first annular groove 14 is formed coaxially to said second hole 13 but on the opposite side with respect to the raised portion 11.

Said first groove 14 has a larger diameter than the second hole 13 and constitutes a first seat 15 for the temporary engagement of an insert 16 for coupling to the raised portion 11.

A ridge 17 protrudes at right angles from the flat base 8 and is arranged at the joining point of the tab 9 and along an axis that is perpendicular thereto; said ridge 17 is L-shaped and is constituted by a second flap 18a, which is associated at right angles to the flat base 8 and with which a third flap 18b is associated; said third flap is arranged parallel to the flat base 8 and is in practice V-shaped, with the vertex 18c directed towards the raised portion 11.

The insert 16 for coupling to the raised portion 11 is T-shaped and constituted by a cylindrical stem 19, the free end whereof has a fourth annular flap 20 protruding outside it, and has an axial recess 21 adapted to produce flexing of the stem 19 for insertion in said raised portion 11 and locking in the first seat 15.

The temple 5 has, at the end 4, a step-like shape 22 that is complementary to the ridge 17 and is adapted to allow their mutual coupling.

The temple 5 has, at the raised portion 11, a third hole 23 in the form of a female part adapted to allow the passage of the raised portion 11; coaxially to said third hole 23 there is provided, proximate to the outer surface of the temple 5, a second annular groove 24 adapted to allow the snap insertion of the first annular flap 12.

The first element 7 is rotatably associable with a second element 25 that can be connected to the front 2 of the eyeglasses 1 at a second seat 26 formed proximate to the lateral end 3.

Said second element 25 is constituted by a plate 27, which can be arranged externally adjacent to the front 2 proximate to the second seat 26 and from which a projection 28 protrudes at right angles and can be inserted in said second seat 26.

A pivot 29 is arranged at right angles on the projection 28 and is shaped complementarily to the first hole 10 provided on the tab 9.

Assembly of the connecting device to the eyeglasses is as follows: the flat base 8 of the first element 7 is associated with the temple 5, inserting with a snap action the raised portion 11 at the third hole 23 that is provided on the temple 5 and inserting the upper end 4 in the ridge 17; the coupling insert 16 is associated with a snap action, arranging the fourth annular flap 20 in the first seat 15; the second element 25 is associated with the front piece 2 and the pivot 29 is inserted in the first hole 10, thus allowing a rotatable connection between the first and the second elements.

It has been found that the device thus conceived has achieved the intended aim and objects, allowing to detachably connect, very quickly and easily, with modest manufacturing costs, and without welds, two components of eyeglasses, such as for example a front and a temple, at least one whereof is made of aluminum or carbon fibers.

Furthermore, since the inventive device is made of plastics, it is not subject to oxidations that can alter the aesthetics of the eyeglasses.

The invention is of course susceptible of numerous modifications and variations, all of which are within the scope of the same inventive concept.

Thus, for example, in a different embodiment of the connecting device the flat base 8 can be associated outside the temple 5.

Figure 4:
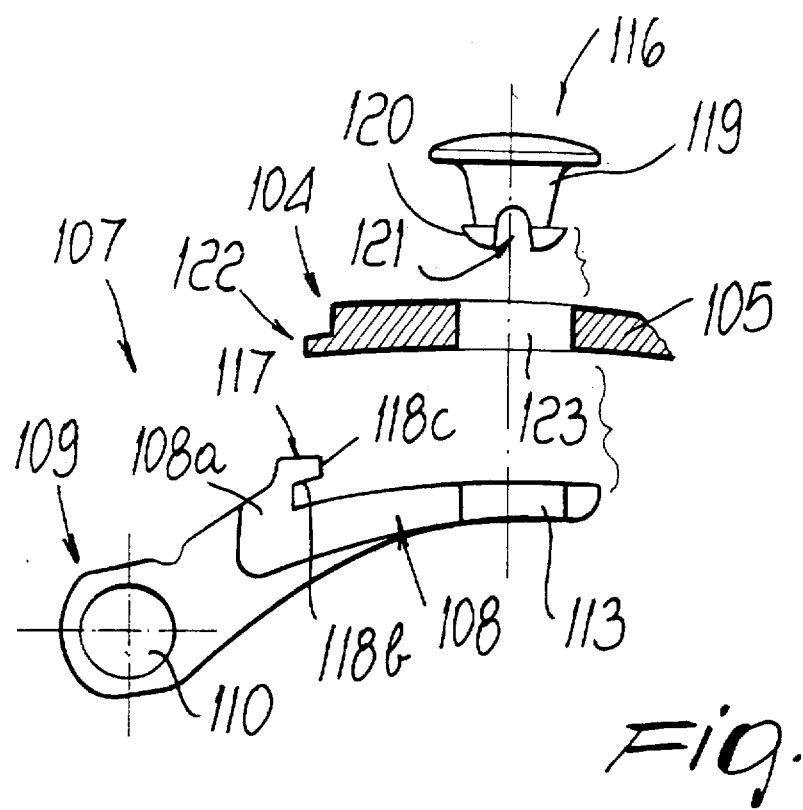
FIGS. 4, 5, 6, 7, 8, and 9 are partially sectional front views of further embodiments of the connecting device.

A further embodiment of the connecting device is shown in FIG. 4 and is constituted by a first element 107 comprising a flat base 108 from which a curved tab 109 protrudes in an approximately axial fashion, said tab having a first hole 110 formed along an axis arranged on a plane that is approximately parallel to the plane containing said flat base 108.

A second hole 113 is formed on the flat base 108, on the opposite side with respect to the tab 109, with its axis perpendicular to said flat base 108, and allows the insertion of a temporary coupling insert 116.

The flat base 108 furthermore has an L-shaped ridge 117 arranged at the joining point of the tab 109 and constituted by a second flap 118a, which is associated, at right angles, with the flat base 108 and with which a third flap 118b is associated and arranged parallel to the flat base 108; said third flap is V-shaped in plan view, with the vertex 118c directed towards the second hole 113.

The T-shaped plug 116 is constituted by a cylindrical stem 119 the free end whereof has a fourth annular flap 120 protruding outside said stem and an axial recess 121 adapted to allow elastic deformation of the stem 119 for insertion in the second hole 113.

The temple 105 has, at the end 104, a step-like shape 122 that is complementary to the ridge 117 and allows coupling to said ridge.

The temple 105 furthermore has a third hole 123 arranged axially at the second hole 113 and adapted to allow the passage of the insert 116.

The stem 119, which is inserted with a snap action in the third hole 123 and then in the second hole 113, protrudes from the flat base 108, allowing the fourth annular flap 120 to abut against the lower surface of the flat base 108.

Figure 5:
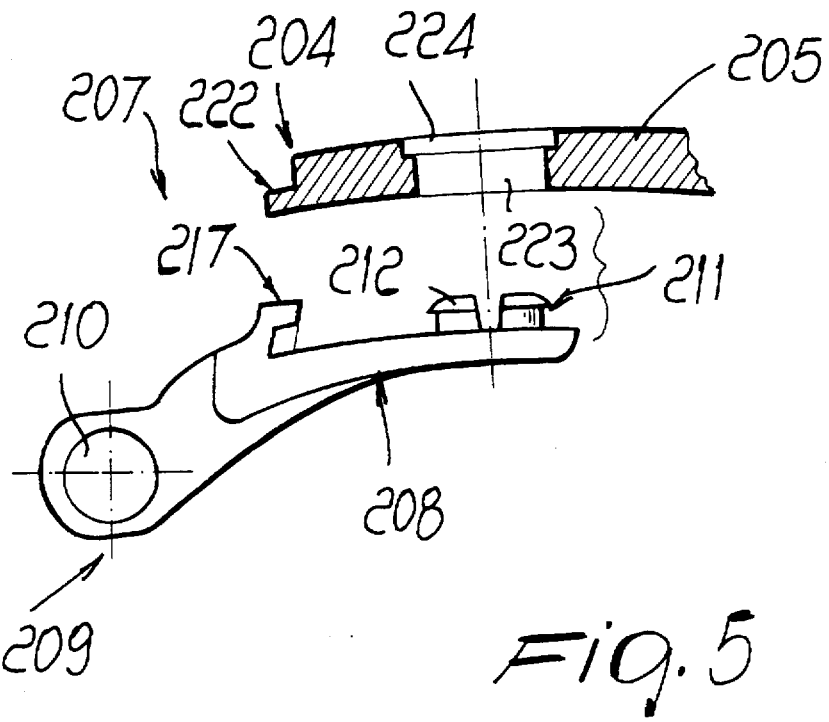

FIG. 5 illustrates a further embodiment of the connecting device, constituted by a first element 207 having a flat base 208 that can be arranged adjacent to a temple 205 at the end 204.

A curved tab 209 protrudes approximately axially from the flat base 208 and has a first hole 210 formed along an axis lying on a plane that is approximately parallel to the plane containing said flat base 208.

A raised portion 211 for temporary coupling to the temple 205 protrudes at right angles from the flat base 208 on the opposite side with respect to the tab 209.

Said raised portion 211 is cylindrical and has notches, along some of its generatrices, which allow elastic deformation thereof; furthermore, at the upper perimetric edge said raised portion 211 has a first annular flap 212 that protrudes outside said raised portion.

The flat base 208 has a perimetric ridge 217 which is arranged at the coupling of the tab 209 and is L-shaped.

The temple 205 has, at the end 204, a step-like shape 222 that is complementary to the ridge 217 and allows temporary coupling.

The temple 205 furthermore has a third hole 223 having, proximate to the outer surface of the temple 205, a second annular groove 224 that allows the snap insertion of the first annular flap 212.

Figure 6:
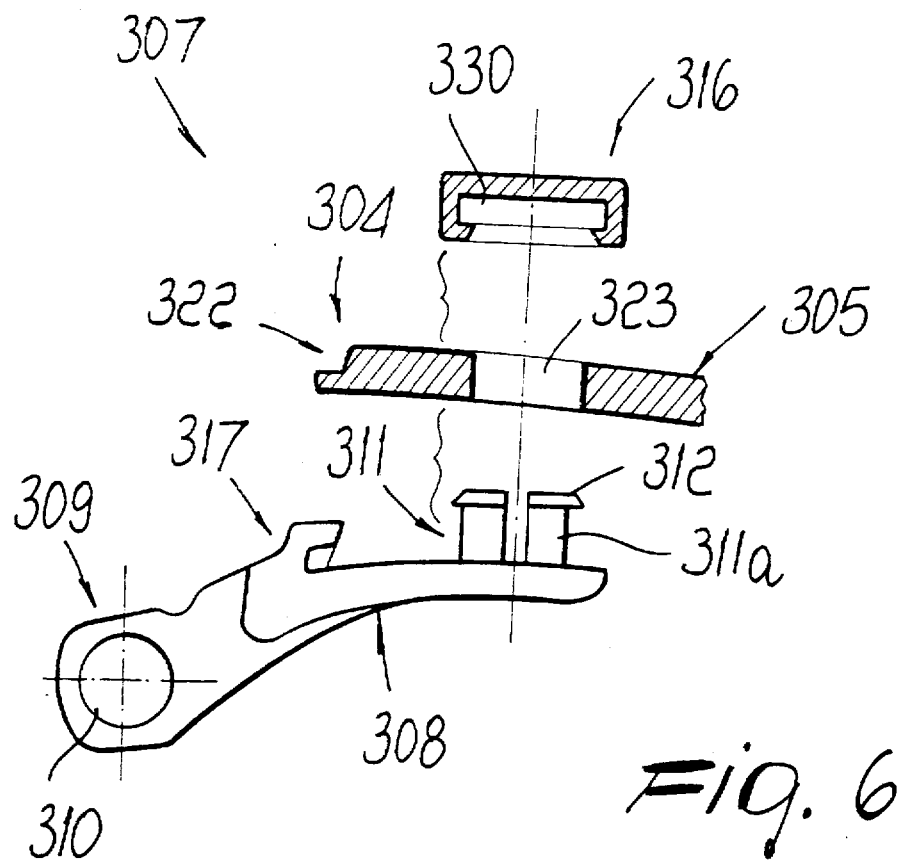

A different embodiment of the first element of the connecting device is shown in FIG. 6, where it is designated by the reference numeral 307; said first element has a flat base 308 wherefrom a curved tab 309 protrudes approximately axially; said tab has a first hole 310 formed along an axis lying on a plane that is approximately parallel to the plane containing said flat base 308.

A cylindrical raised portion 311 protrudes from the flat base 308 at right angles and on the opposite side with respect to the tab 309; said raised portion is constituted by a stem 311a having notches, along some of its generatrices, that allow it to deform elastically.

The stem 311a is longer than the temple 305 is thick, and has, at the upper perimetric edge, a first annular flap 312 that protrudes externally to said stem and allows temporary engagement for a coupling insert 316.

The flat base 308 has a perimetric ridge 317 that is L-shaped and arranged at the joining point of the tab 309.

The coupling insert 316 is plug-shaped and is internally provided with a third seat 330 shaped complementarily to the first annular flap 312 of the raised portion 311 and allowing temporary coupling of the insert 316 to the raised portion 311.

The temple 305 has, at the end 304, a step-like shape 322 that is complementary to the ridge 317, whereas the temple 305 has a third hole 323 that is arranged coaxially to the raised portion 311 and has such a diameter as to allow the stem 311a to pass.

Figure 7:
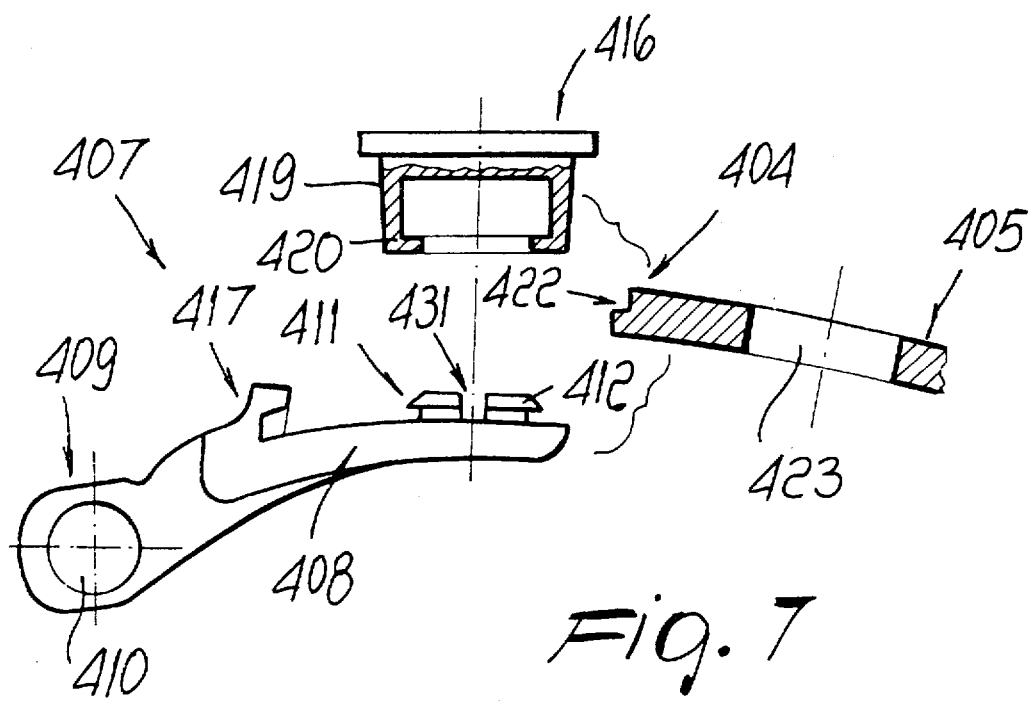

A further embodiment of the first element of the connecting device is shown in FIG. 7, where it is designated by the reference numeral 407.

The first element 407 is constituted by a flat base 408 that can be arranged adjacent to a temple 405 at one end 404.

A curved tab 409 protrudes approximately axially from the flat base 408 and has a first hole 410 arranged along an axis lying on a plane that is parallel to the plane containing said flat base 408.

A mushroom-shaped raised portion 411 for temporary coupling protrudes at right angles from the flat base 408 at the opposite end with respect to the tab 409 and is substantially shorter than the thickness of the temple 405; furthermore, said raised portion 411 has, at the upper perimetric edge, a first annular flap 412 that protrudes outside it and at least one axial recess 431 that is adapted to allow the first annular flap 412 to deform elastically and is adapted to allow temporary coupling to an insert 416.

The flat base 408 has a L-shaped ridge 417 arranged at the joining point of the tab 409 and adapted to allow the insertion of the complementarily shaped end 404 of the temple 405.

The insert 416 for coupling to the raised portion 411 is T-shaped and is constituted by a hollow cylindrical stem 419 the free end whereof has a fourth annular flap 420 protruding inside said stem and allowing the insertion of the first flap 412 of the raised portion 411.

The temple 405 furthermore has a third hole 423 coaxially to the raised portion 411 that has such a diameter as to allow the passage of the stem 419 of the raised portion 411.

Figure 8:
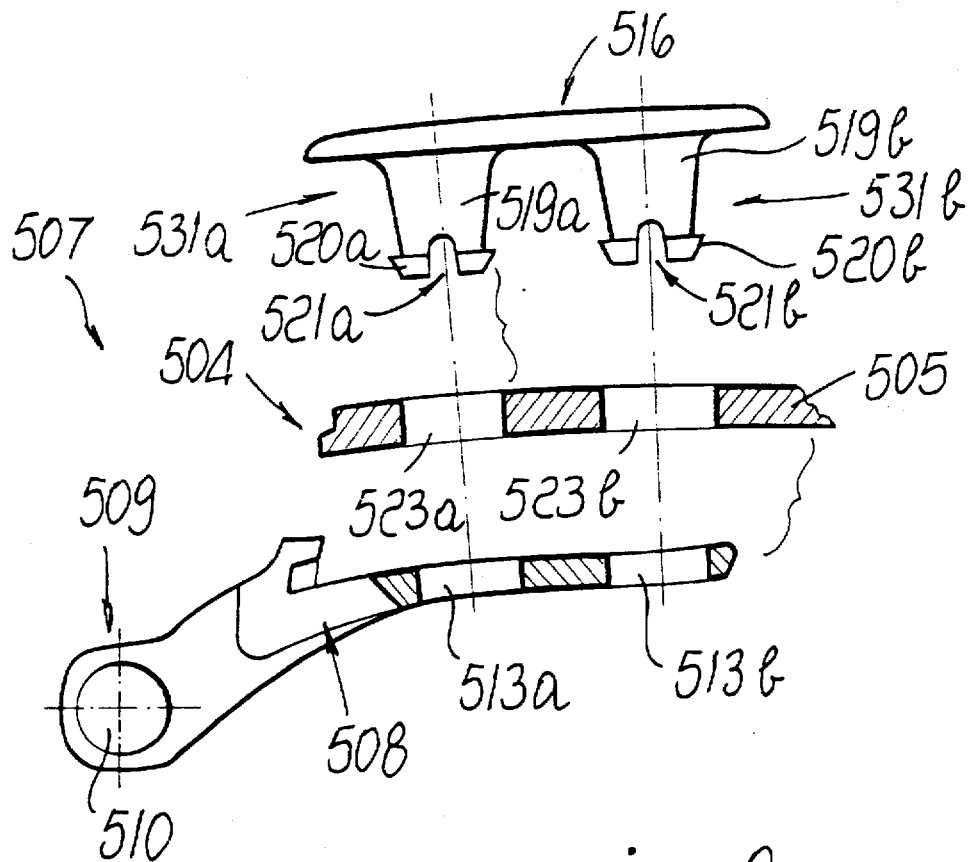

FIG. 8 illustrates a different embodiment of the first element of FIG. 4.

The first element, designated by the reference numeral 507 in FIG. 8, is constituted by a flat base 508, in which two second through holes 513a and 513b are provided, said holes being arranged so that their axis is perpendicular to said flat base 508, and allowing the insertion of a temporary coupling insert 516.

The insert 516 is constituted by two T-shaped elements 531a and 531b that are contiguous at their head; each element is constituted by a cylindrical stem 519a and 519b, the free end whereof has a fourth annular flap 520a and 520b that protrudes outside it and an axial recess 521a and 521b that is adapted to allow elastic deformation of the stems 519a and 519b for their insertion in the two second holes 513a and 513b.

The temple 505 furthermore has two third holes 523a and 523b that are coaxial to the two second holes 513a and 513b of the flat base 508.

Figure 9:
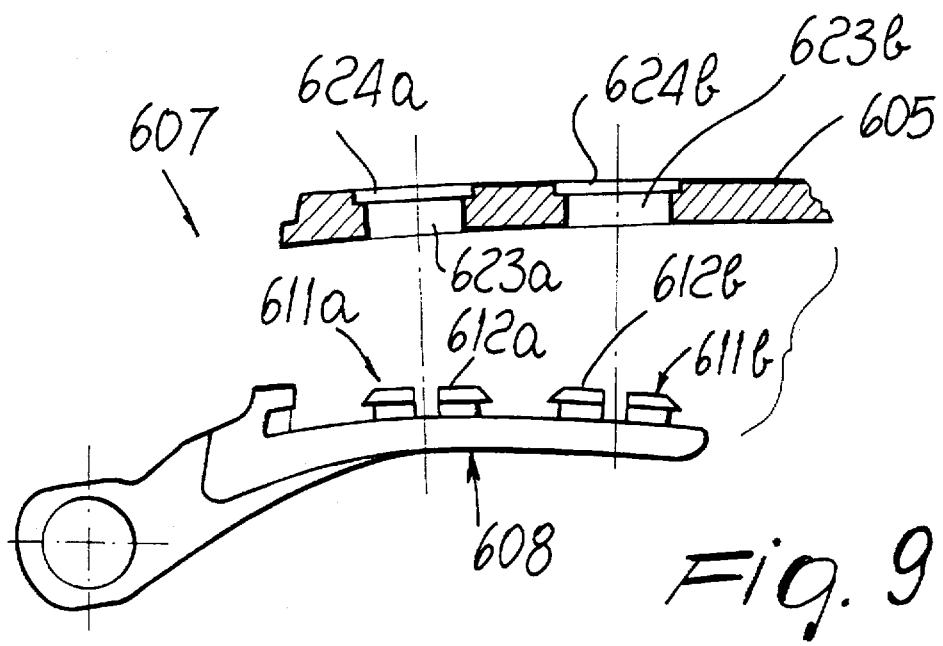

FIG. 9 illustrates a different embodiment of the first element of FIG. 5.

The first element, designated by the reference numeral 607 in FIG. 9, is constituted by a flat base 608, from which two mutually identical cylindrical raised portions 611a and 611b protrude at right angles; said raised portions have notches, along some of their generatrices, that are adapted to allow their elastic deformation; furthermore, at the upper perimetric edge each raised portion 611a and 611b has a first annular flap 612a and 612b that protrudes outside it.

The temple 605 furthermore has two third holes 623a and 623b, each whereof has, at the outer surface of said temple 605, a second annular groove 624a and 624b that allows the snap insertion of each one of the annular flaps 612a and 612b of the raised portions 611a and 611b.

All these variations, too, allow to achieve the intended aim and objects.

The invention thus allows to provide, for example, temples with two-dimensional machinings, such as blanking or milling on two axes or laser cuts, since the connecting device can also act as a hinge.

It is thus possible to reduce manufacturing costs if one of the components is made of a material that cannot be easily welded to another component or cannot be welded at low costs.

The connecting device is furthermore fixed to the temple simply by providing a hole, and this reduces costs further.

The particular fixing to the temple, caused by the presence of the raised portion provided with the notches, allows to have components featuring even wide tolerances and which can thus be manufactured at lower costs.

The materials and the dimensions constituting the individual components of the device may of course also be the most appropriate according to the specific requirements.

What is claimed is:

1. A combination of an eyeglass temple member and an eyeglass front member, and a connecting device being interconnected between said temple member and said front member such as to mutually pivotally connect said temple member and said front member, said connecting device comprising a pivot connection, and the combination further comprising an interconnection arrangement between said connecting device and said temple member, said interconnection arrangement comprising:

at least one male part connected with one of said connecting device and said temple member; and at least one female part connected with the other one of said connecting device and said temple member;

wherein said male part is accommodated in said female part so as to connect said connecting device and said temple member;

and wherein said male part is elastically deformable such that upon mutually interconnecting said connecting device and said temple member)said male part elastically deforms while being inserted into said female part and subsequently said male part connects with said female part in a snap-together manner.

2. The combination of claim 1 wherein said female part comprises a hole formed in said temple member, and said male part comprises a protrusion which protrudes from said connecting device..

3. The combination of claim 2 wherein said temple member has a longitudinal extension and said hole has a central axis extending substantially perpendicularly to the longitudinal extension of said temple member.

4. The combination of claim 3 wherein said connecting device comprises a first element having a base, said protrusion protruding from said base, and said base being arranged adjacent a mating surface of said temple member.

5. The combination of claim 4 wherein said mating surface is arranged on an internal surface of said temple member which is adapted for facing a user's head.

6. The combination of claim 5 wherein said connecting device comprises a second element connected with said front member.

7. The combination of claim 6 wherein said pivot connection of said connecting device comprises a hole provided on a curved tab portion of said first element extending from said base, and a pivot element connected with said second element and being arranged in said hole provided on said curved tab.

8. The combination of claim 1 wherein said female part comprises a hole with a circular configuration and wherein said male part comprises a protrusion having a cylindrical wall portion provided with axially extending slits for providing elastic deformability of said protrusion.

9. The combination of claim 8 wherein said protrusion further has a discontinuous annular protruding flap arranged at an upper perimetric edge of said protrusion, and wherein said female part has an abutment step mating with said annular protruding flap of said protrusion.

10. The combination of claim 9 wherein said protrusion protrudes from said connecting device and wherein said hole is provided in said temple member, and wherein said abutment step is provided within said hole in said temple member.

11. The combination of claim 10 wherein a central hole is provided through said connecting device inside said protrusion, and wherein said hole is a through hole extending entirely through said temple member, and wherein an insert is provided which is lodged inside said through hole.

12. The combination of claim 9 wherein said hole is provided in said connecting device and wherein said protrusion comprises an insert element which is connected with said temple element by extending through a through hole extending entirely through said temple member, and wherein said abutment step is provided at an outer surface of said connecting device.

13. The combination of claim 9 wherein said protrusion protrudes from said connecting device and wherein said hole extends entirely through said temple member, and wherein said female part further comprises a coupling insert with a recess in which said annular protruding flap of said protrusion is engaged.

14. The combination of claim 13 wherein said coupling insert is arranged outside of said hole extending through said temple member.

15. The combination of claim 13 wherein said coupling insert comprises a cylindrical portion arranged inside said hole extending through said temple member.

16. The combination of claim 9 comprising a pair of protrusions protruding from said connecting device and a pair of holes provided in said temple member each of which accommodates a respective protrusion, and each of which is internally provided with a respective abutment step.

17. The combination of claim 9 comprising a pair of holes provided in said connecting device and a pair of protrusions in the form of a pair of insert elements each connected with said temple member by extending through a respective through hole extending entirely through said temple member, and wherein a pair of abutment steps are provided at an outer surface of said connecting device.

18. The combination of claim 1 wherein said female part comprises a hole formed in said temple member, and wherein said temple member comprises an end with a step shape which is inserted in a U-shaped portion of said connecting device.

19. The combination of claim 18 wherein said temple member has a longitudinal extension and said hole has a central axis extending substantially perpendicularly to the longitudinal extension of said temple member.

20. The combination of claim 19 wherein said connecting device comprises a first element having a base which is arranged adjacent a mating surface of said temple member.

21. The combination of claim 20 wherein said U-shaped portion of said connecting device is arranged at an end of said base.

22. The combination of claim 21 wherein said connecting device comprises a second element connected with said front member, and wherein said pivot connection of said connecting device comprises a hole provided on a curved tab portion of said first element extending from said base, and a pivot element connected with said second element and being arranged in said hole provided on said curved tab.

23. The combination of claim 1 wherein said interconnection arrangement is a detachable interconnection arrangement which allows said temple member to be detached from said connecting device and reconnected with said connecting device.

* * * * *